United States Patent
Crittenden et al.

(10) Patent No.: US 7,310,592 B2
(45) Date of Patent: Dec. 18, 2007

(54) METHOD AND APPARATUS TO GROUP SETS OF COMPUTERS INTO CLASSES FOR STATISTICAL ANALYSIS

(75) Inventors: Heidi A. Crittenden, Bellevue, WA (US); Mario R. Garzia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 41 days.

(21) Appl. No.: 11/112,594

(22) Filed: Apr. 22, 2005

(65) Prior Publication Data

US 2006/0241902 A1 Oct. 26, 2006

(51) Int. Cl.
G06F 19/00 (2006.01)
(52) U.S. Cl. ............... 702/186; 702/179; 702/182; 714/38; 717/101
(58) Field of Classification Search ................ 702/186, 702/81, 83, 127, 179–181, 182, 183, 185, 702/187, 188, 176, 178, 119, 123
See application file for complete search history.

(56) References Cited

U.S. PATENT DOCUMENTS

| | | | | |
|---|---|---|---|---|
| 5,684,945 | A | * | 11/1997 | Chen et al. .................... 714/20 |
| 6,820,215 | B2 | * | 11/2004 | Harper et al. ................. 714/15 |
| 2004/0230872 | A1 | * | 11/2004 | Mullally et al. .............. 714/38 |
| 2005/0114501 | A1 | * | 5/2005 | Raden et al. ............... 709/224 |
| 2006/0143350 | A1 | * | 6/2006 | Miloushev et al. ......... 710/242 |

OTHER PUBLICATIONS

Garzia, M., "Assessing the Reliability of Windows Servers," 10 pages, no date.

* cited by examiner

Primary Examiner—Hal Wachsman
(74) Attorney, Agent, or Firm—Marshall, Gerstein & Borun LLP

(57) ABSTRACT

A method of grouping sets of computers into a single class for statistical analysis is disclosed. The method may look at various factors to create equivalent classes of computers depending on the level of aggregation desired which then may be used to provide additional data from which reliability statistics may be calculated on the uptime of computers.

20 Claims, 3 Drawing Sheets

METHOD AND APPARATUS TO GROUP SETS OF COMPUTERS INTO CLASSES FOR STATISTICAL ANALYSIS

BACKGROUND

In measuring reliability and availability data, long periods of time are needed in order to get better and more accurate measurements. Often the amount of time needed in order to gather appropriate amounts of data for certain types of failures exceeds the amount of time that can realistically be gathered from a single computer. When possible this makes it desirable to be able to combine runtime information from multiple computers and be able to treat these groups of computers as a single system, thus ensuring that enough time has elapsed to more accurately measure reliability. To do this correctly, it is important to understand when it is appropriate to aggregate sets of computers into a single system and when grouping data from sets of computers not appropriate.

SUMMARY

A method of grouping sets of computers into a single class for statistical analysis is disclosed. The method may look at various factors to create equivalent classes of computers which then may be used to provide more statistically reliable information on the uptime of computers.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible.

Figure 1:
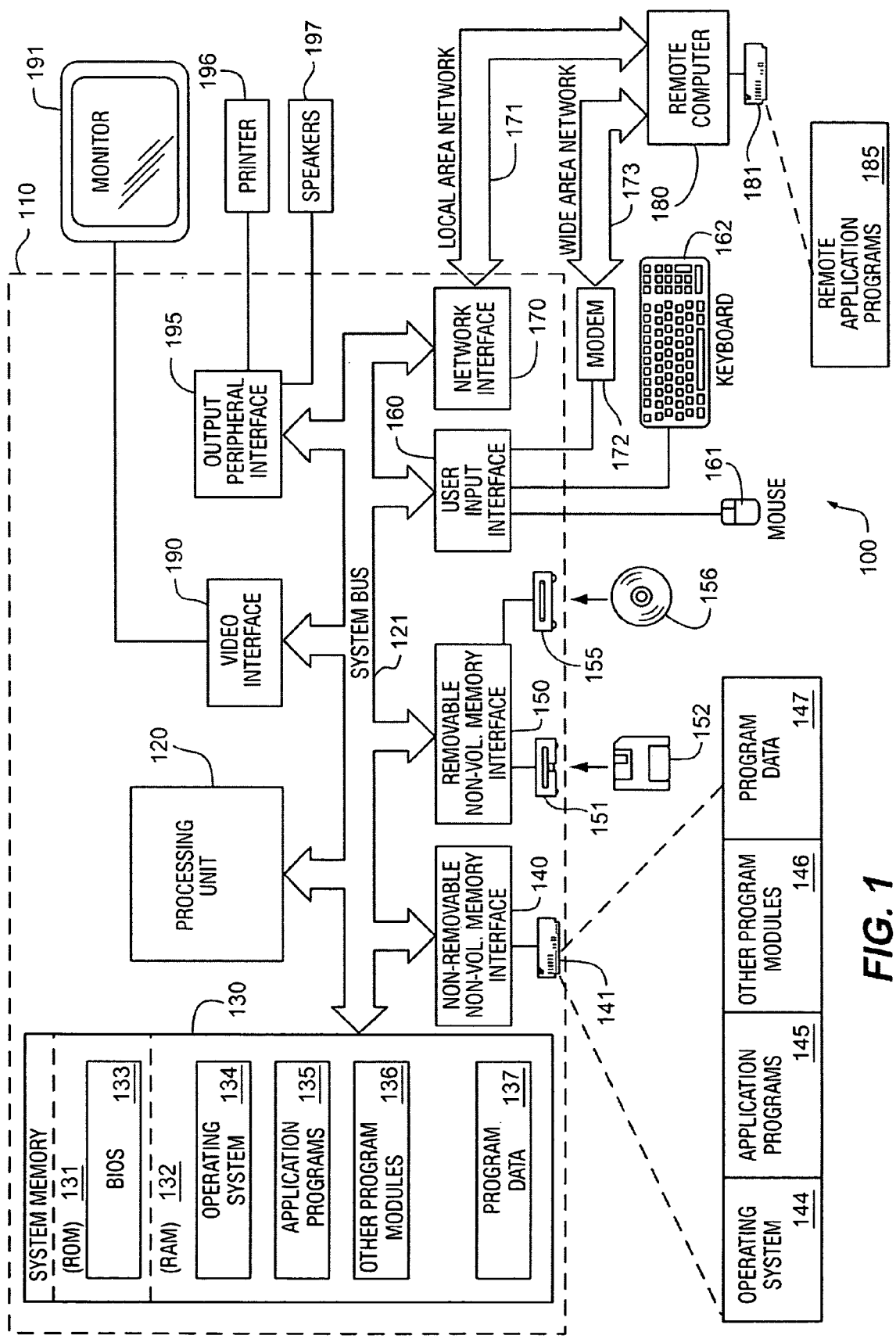
FIG. 1 is a block diagram of a computing system that may be used to perform a method of grouping sets of computers into classes for statistical purposes.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

As calculating reliability and availability metrics may require long runtimes, a common approach to reduce the amount of time needed for data collection may be to measure a set of comparable computers (say a set of computers performing the same function in the same environment) and sum all of their runtimes. The assumption may be that if these computers are equivalent in behavior and failures are considered to be independent events then it is reasonable to consider these computers as equivalent to the experience of a single computer with runtime equal to the sum of runtimes of the individual computers. In addition, the individual computer runtimes may need to be sufficiently long to experience an appropriate sample of the possible shutdown events. This may require careful selection of the computers that are considered to be equivalent. Variability from one computer technology/application to another may be quite high.

Figure 2:
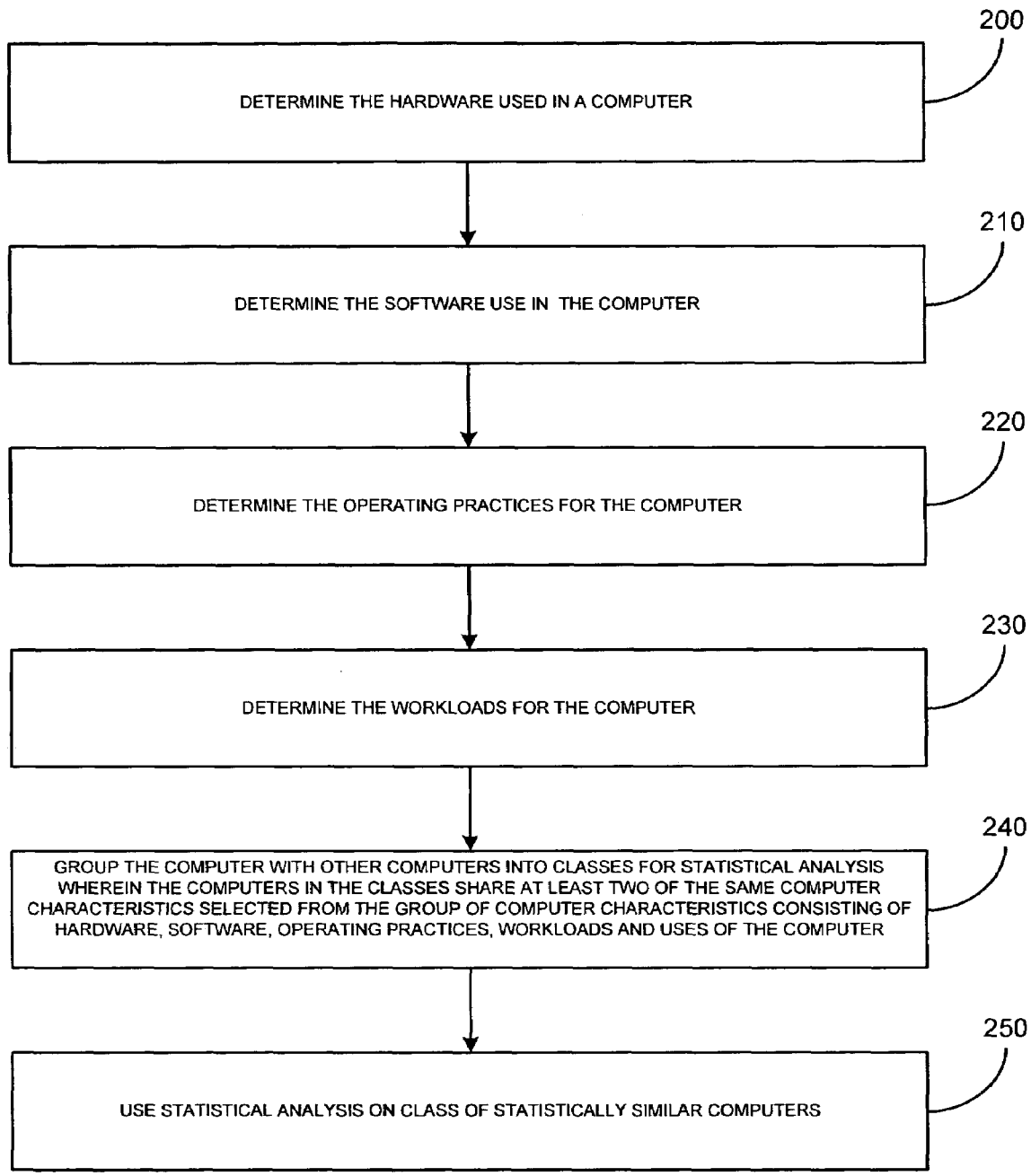
FIG. 2 is a flowchart of a method in accordance with the claims.

FIG. 2 is an illustration of a flowchart of one embodiment of a method of grouping sets of computers into a single class for statistical analysis in accordance with the claims. Other embodiments are possible.

Equivalence Systems

Systems may be assumed to be equivalent when they are similar in characteristics such as hardware, software, operating practices, work loads, or a combination of these characteristics. When systems are assumed to be equivalent each computer runtime may be treated as a runtime experience contributing to a single overall system runtime experience. Equivalent computers may be called components members of the equivalence class for a particular system.

In the case of an equivalence system, all computers may be considered to act similarly and hence the data for runtime and events for each computer may be aggregated to add to a single larger system runtime experience. An example of an equivalence system may be a company's IS data center where there is similar hardware, software, similar operation, workload, and hours of operation. Another example of an equivalence system may be a company's call center or help desk. In these cases, the applications running on the systems may be similar, there may be similar hardware and software, similar expected hours of operation, and similar work loads for the individual computers.

In certain cases the grouping of computers, systems or groups of systems may no longer be assumed to be equivalent and must be identified as separate systems. This leads to another classification of systems.

Non-Equivalent Systems

Systems or groups of systems may be non-equivalent when there is different hardware or software, different operating practices, or work loads impacting their resulting reliability. When systems are assumed to be non-equivalent, each system (or group of systems) may be treated as a unique system.

An example of a non-equivalent grouping of systems may be a company division where some of the computers are used to build documentation (power point presentation, word documents, excel, etc.) and some computers are used to a run line of business application such as payroll and "booking and shipping". The first and second groupings are each examples of equivalent classes of systems, but the grouping of the two systems together may be treated as two separate sets of systems.

Existing reliability and availability tools assumed systems to always be equivalent or to be non-equivalent. No effort was made to programmatically understand the population space from which the data was being sampled and then apply the appropriate methodology for groupings of equivalent and non-equivalent systems. With the disclosed method, the demographics of the population space may be identified and well understood, and then the appropriate techniques for aggregating the data may be applied.

At block 200, the method may determine the hardware used in a computer. The hardware used may range from generic single processor computers to multi-processor and fault tolerant architectures, each with its own inherent reliability characteristics. As one would expect, the results obtained from these different systems may vary greatly and care must be taken to select the right level of fault tolerance for any one application.

At block 210, the method may determine the software used in the computer. Software may include the operating system, device drivers, applications and interactions among software components. For example, two applications may perform very reliably in isolation but when installed on a single computer can lead to frequent system failures. Not only must the software be reliable to begin with but it must also work well with all the other hardware and software in the system. In analyzing data, it may be important to be able to group results from similar systems (in terms of hardware and software) together to understand the reliability of the particular configuration and be able to compare these with that of other configurations to identify the best ones.

At block 220, the method may determine the operating practices for the computer. There may be many ways in which operational procedures impact the reliability results. Results from computers with similar software and hardware may vary greatly. For example, a 24×7 operation will have different reliability than a system with frequently scheduled downturns. The reliability objectives will need to specify if this is a 24×7 operation with no scheduled downtime (every shutdown impacts on the reliability objectives) or whether there are specified maintenance windows (e.g., Sunday's 8 am to 12 pm) during which all maintenance work needs to take place.

When maintenance windows are allowed, it may be the case that any downtime or shutdowns that occur during this time are not to be counted towards the reliability objectives. Analyzing data from a data center without understanding it's operational practices and needs may not be done with any level of accuracy as measurement results will not be properly interpreted. For example, a data center with a Sunday maintenance window may tend to experience most of its computer shutdowns during this period (usually all non-failure shutdowns) in close proximity of each other. Not realizing that this is a maintenance window and properly accounting for it in the analysis may lead to the wrong interpretation.

Other behavior may affect downtime, such as:
Experience gained over time by operators with a new system;
Improvement in operational procedures/tools for managing a new system; and
Software improvements as faults are identified and fixes applied.

At block 230, the method may determine the workloads for the computer. Traffic loads and traffic characteristics may also impact results. For example, a web farm with a load balancer and five web servers may result in the five web servers having similar workloads.

The previous four factors, specifically, hardware, software, operating practices and workloads, may all determine the use or character of the computer.

At block 240, the method may group the computer with other computers into classes for statistical analysis wherein the computers in the classes share at least two of the same computer characteristics selected from the group of computer characteristics consisting of hardware, software, operating practices and workloads of the computer.

Any of the above mentioned groups may provide useful data depending on the demands of the analyst. Some analysts may be solely concerned with hardware and these analysts may focus on computers with the same hardware. Other analysts may want a broader overview and may focus on the uses of the computers which takes into account the hardware, software, operating practices and workload of the computers. Varying weights may be placed on any of the different determinations. For example, a greater weight may be placed on having the same hardware than the same software.

At block 250, the method may use statistical analysis on the class of statistically similar computers. The statistics may be used to determine the uptime of a class or of all computers. The uptime of a class of computers may be compared to the uptime of all computers. Intentional downtimes may not be counted as time of a class can be aggregated to created a more meaningful statistical analysis.

For Example, $$\text{Availability (For Equivalent System)} = \frac{\sum_{j=1}^{N}\sum_{i=1}^{M(j)} \text{uptime\_period}(i)}{\sum_{j=1}^{N}\sum_{i=1}^{M(j)} \text{uptime\_period}(i) + \sum_{j=1}^{N}\sum_{i=1}^{P(j)} \text{downtime\_period}(i)}$$

Where N is the number of equivalent computers and computer(j) is an individual computer.

Where M(j) is the number of uptime intervals for computer (j) and P(j) is the number of downtime intervals for computer (j)

Note:

$M-1 < P < M+1$

In one embodiment, the method has the ability to programmatically calculate reliability data across the multiple equivalence classes of systems.

For Example, $$\text{Aggregate Availability (For Multiple Classes of Non-Equivalent System)} = \frac{\sum_{j=1}^{N} \text{Availability\_system}(j)}{N}$$

$$= \frac{\sum_{j=1}^{N}\left(\frac{\sum_{i=1}^{M(j)} \text{uptime\_period}(i)}{\sum_{i=1}^{M(j)} \text{uptime\_period}(i) + \sum_{i=1}^{P(j)} \text{downtime\_period}(i)}\right)}{N}$$

Where N is the number of non-equivalent system and system (j) is a system or equivalence class of systems.

Where M(j) is the number of uptime intervals for system (j) and P(j) is the number of downtime intervals for system(j)

Figure 3:
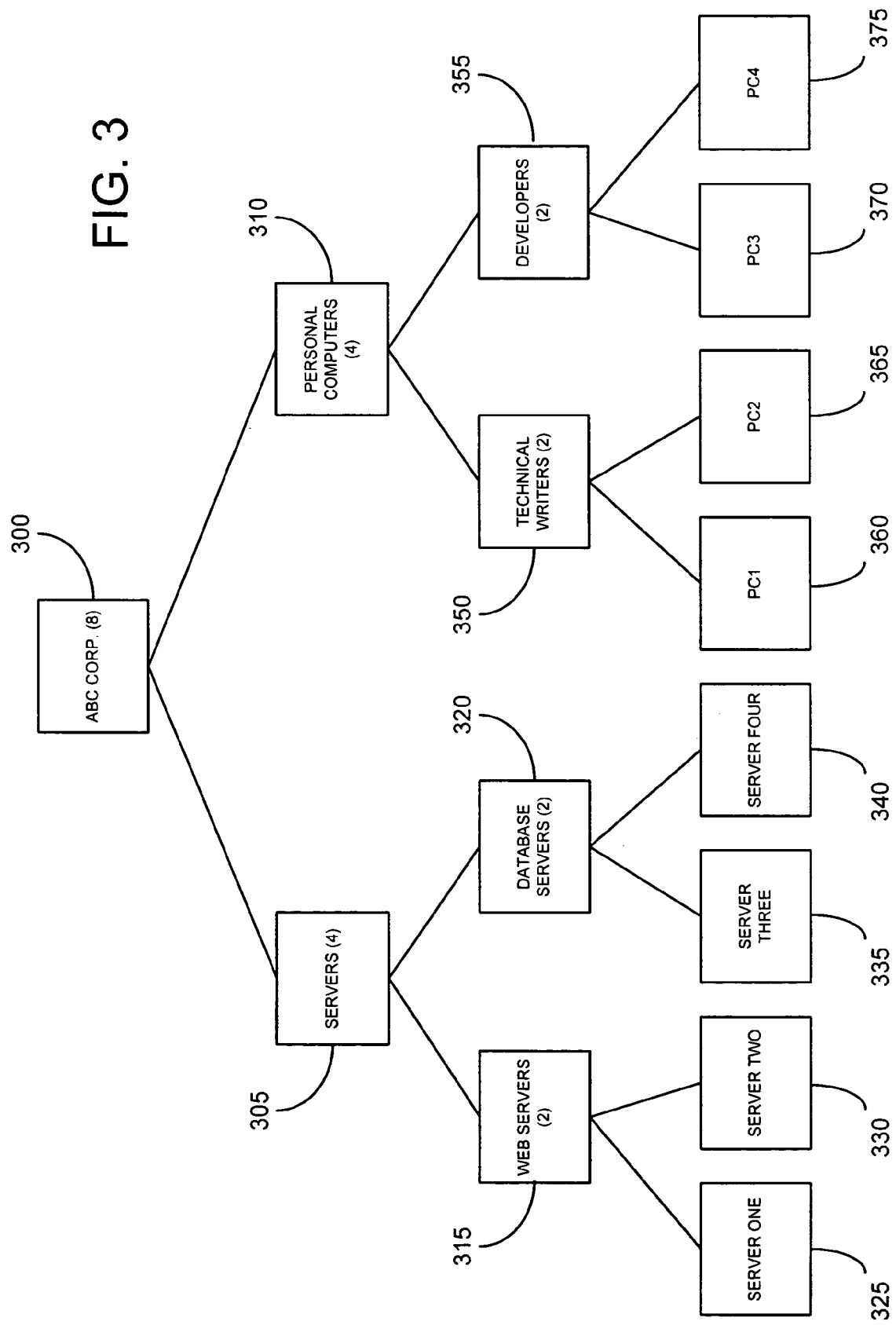
FIG. 3 is an illustration of the various levels of data aggregation that are possible.

FIG. 3 may illustrate the concept of the different levels of aggregation that may be possible. As an example, ABC Corp. 300 may have eight computers, four of which may be servers (305) and four of which may be personal computers (310). There may be two web servers 315 and two database servers 320. The web servers may be referred to as server one 325 and server two 330 and the database servers 320 may be referred to as server three 335 and server four 340. Of the four personal computers 310, two may be used by technical writers 350 (PC1 360 and PC2 365) and two may be used by developers 355 (PC3 370 and PC4 375). The president of ABC Corp. may just be concerned with the entire universe of computers used at ABC and may just want to look at all the computers as one aggregation unit. However, the IT manager may be concerned with a different aggregation level as she may wonder what type of PC is best suited for long term use. Assuming PC1 360 and PC2 are one type of computer and PC3 and PC4 are a different type of computer (and ignoring the different uses of the PCs for this example), the IT manager may want to compare the uptime of PC1 360 and PC2 365 to that of PC3 370 and PC4 375 to determine if one type of PC is better than another. Of course, numerous other manners of aggregating computers is possible, depending on the desired information.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of programmatically grouping sets of computers into a single class for statistical analysis comprising:
   determining the hardware used in a computer;
   determining the software used in the computer;
   determining the operating practices for the computer;
   determining the workloads for the computer;
   applying weights to the determined hardware, software, operating practices and workload;
   grouping the computer with other computers into classes for statistical analysis wherein the computers in each of the classes share at least two of the same computer characteristics selected from the group of computer characteristics consisting of:
   hardware;
   software;
   operating practices; and
   workloads;
   using statistical analysis on a class of statistically similar computers;
   creating a report that contains results of the statistical analysis; and
   providing the report to a user such that the user uses the report to improve performance of the computers.

2. The method according to claim 1, comprising determining the uptime of a class.

3. The method according to claim 1, comprising determining the uptime of all the computers.

4. The method according to claim 1, comprising comparing the uptime of a class of computers to the uptime of all the computers.

5. The method according to claim 1, wherein a class is made up of computers that share computer characteristics that have been determined to be statistically similar.

6. The method according to claim 1, further comprising aggregating computers into groups depending on the desired level of analysis.

7. The method according to claim 1, wherein intentional downtimes are not counted as time of a class that is aggregated.

8. A computer readable medium having computer executable instructions for performing a method of programmatically grouping sets of computers into a single class for statistical analysis, comprising:
   computer executable instructions for determining the hardware used in a computer;
   computer executable instructions for determining the software used in the computer;
   computer executable instructions for determining the operating practices for the computer;
   computer executable instructions for determining the workloads for the computer;
   computer executable instructions for applying weights to the determined hardware, software, operating practices and workload;
   computer executable instructions for grouping the computer with other computers into classes for statistical analysis wherein the computers in each of the classes share at least two of the same computer characteristics selected from the group of computer characteristics consisting of:
   hardware;
   software;
   operating practices; and
   workloads;
   computer executable instructions for using statistical analysis on a class of statistically similar computers and
   computer executable instructions for creating a report that contains results of the statistical analysis wherein a user uses the report to improve performance of the computers.

9. The computer readable medium of claim 8, further comprising computer executable instructions for determining the uptime of a class.

10. The computer readable medium of claim 8, further comprising computer executable instructions for determining the uptime of all the computers.

11. The computer readable medium of claim 8, further comprising computer executable instructions for comparing the uptime of a class of computers to the uptime of all the computers.

12. The computer readable medium of claim 8, wherein a class is made up of computers that share computer characteristics that have been determined to be statistically similar.

13. The computer readable medium of claim 8, further comprising computer executable instructions for aggregating computers into groups depending on the desired level of analysis.

14. The computer readable medium of claim 8, further comprising not counting intentional downtimes as time of a class.

15. A computing apparatus, comprising:
a display unit that generates video images;
an input device;
a processing apparatus operatively coupled to said display unit and said input device, said processing apparatus comprising a processor and a memory operatively coupled to said processor,
a network interface connected to a network and to the processing apparatus; said processing apparatus being programmed to group sets of computers into classes for statistical analysis wherein intentional downtimes are not counted as the time of a class, said processing apparatus being physically configured to:
execute computer executable instructions for determining hardware used in a computer;
execute computer executable instructions for determining software used in the computer;
execute computer executable instructions for determining operating practices for the computer;
execute computer executable instructions for determining workloads for the computer;
execute computer executable instructions for applying weights to the determined hardware, software, operating practices and workloads;
execute computer executable instructions for grouping the computer with other computers into classes for statistical analysis wherein the computers in each of the classes share at least two of the same computer characteristics selected from the group of computer characteristics consisting of:
hardware;
software;
operating practices;
workloads;
execute computer executable instructions for using statistical analysis on a class of statistically similar computers; and
execute computer executable instructions for creating a report that contains results of the statistical analysis wherein the report is used to improve performance of the computers.

16. The computing apparatus of claim 15, further comprising the processing apparatus being physically configured for determining the uptime of a class.

17. The computing apparatus of claim 15, further comprising the processing apparatus being physically configured for determining the uptime of all the computers.

18. The computing apparatus of claim 15, further comprising the processing apparatus being physically configured for comparing the uptime of a class of computers to the uptime of all the computers.

19. The computing apparatus of claim 15, wherein a class is made up of computers that share computer characteristics that have been determined to be statistically similar.

20. The computing apparatus of claim 15, further comprising the processing apparatus being physically configured for aggregating computers into groups depending on the desired level of analysis.

* * * * *